(12) United States Patent
Kim et al.

(10) Patent No.: US 8,298,118 B2
(45) Date of Patent: Oct. 30, 2012

(54) MOTOR-ASSIST SHIFT CONTROL IN A HYBRID VEHICLE TRANSMISSION

(75) Inventors: Min-Joong Kim, Ann Arbor, MI (US); Shawn H. Swales, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 643 days.

(21) Appl. No.: 12/509,781

(22) Filed: Jul. 27, 2009

(65) Prior Publication Data

US 2011/0021311 A1    Jan. 27, 2011

(51) Int. Cl.
```
F16H 31/00     (2006.01)
F16H 61/40     (2010.01)
B60W 10/02     (2006.01)
B60W 10/08     (2006.01)
B60W 10/04     (2006.01)
B60W 10/10     (2006.01)
B60W 20/00     (2006.01)
H02P 15/00     (2006.01)
H02P 15/02     (2006.01)
B60K 6/20      (2007.10)
```
(52) U.S. Cl. ......... 477/15; 477/5; 477/6; 477/8; 477/14; 477/68; 477/115; 477/180; 475/116; 475/118; 475/121; 475/125; 180/65.21; 180/65.285

(58) Field of Classification Search .................. 475/116, 475/118, 121, 125; 477/4–9, 14, 15, 68, 477/115, 180; 180/65.1, 65.21, 65.26, 65.285
See application file for complete search history.

(56) References Cited

U.S. PATENT DOCUMENTS

| | | | | |
|---|---|---|---|---|
| 5,833,570 A | * | 11/1998 | Tabata et al. | 477/3 |
| 6,465,977 B1 | * | 10/2002 | Farkas et al. | 318/432 |
| 6,558,289 B2 | * | 5/2003 | Chung | 477/3 |
| 7,670,256 B2 | * | 3/2010 | Winkelmann et al. | 477/5 |
| 2005/0178593 A1 | * | 8/2005 | Oshidari | 180/65.2 |
| 2006/0196711 A1 | * | 9/2006 | Endo | 180/65.3 |
| 2009/0118084 A1 | * | 5/2009 | Heap et al. | 477/5 |
| 2009/0326778 A1 | * | 12/2009 | Soliman et al. | 701/84 |

FOREIGN PATENT DOCUMENTS

JP    2009261178 A    * 11/2009

* cited by examiner

*Primary Examiner* — Tisha Lewis
(74) *Attorney, Agent, or Firm* — Quinn Law Group, PLLC

(57) ABSTRACT

A method for operating a motor vehicle hybrid powertrain having an engine, a motor-generator and a multi-speed automatically-shiftable transmission, wherein the engine and the motor-generator operate to supply torque to the transmission for driving a vehicle. The method includes modulating the torque supply from the motor-generator to the transmission during a gear shift to minimize a transmission output torque disturbance.

18 Claims, 5 Drawing Sheets

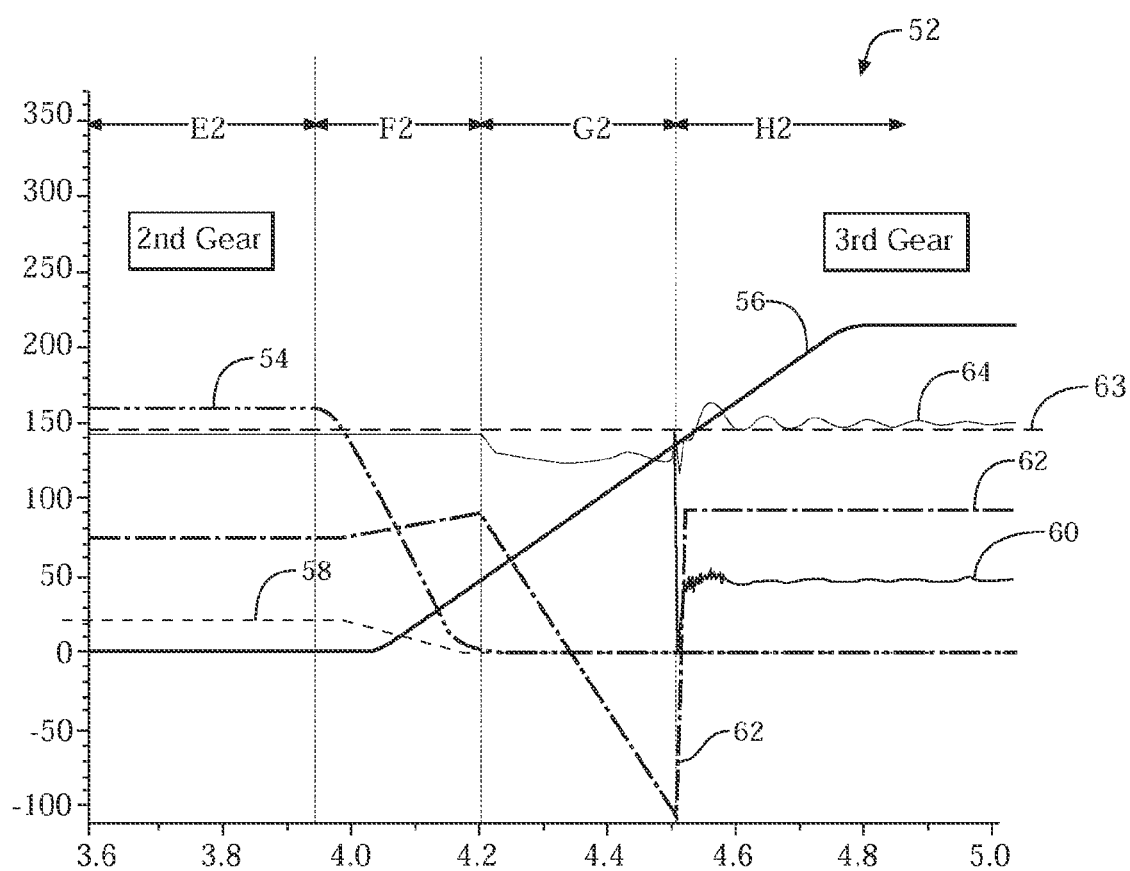

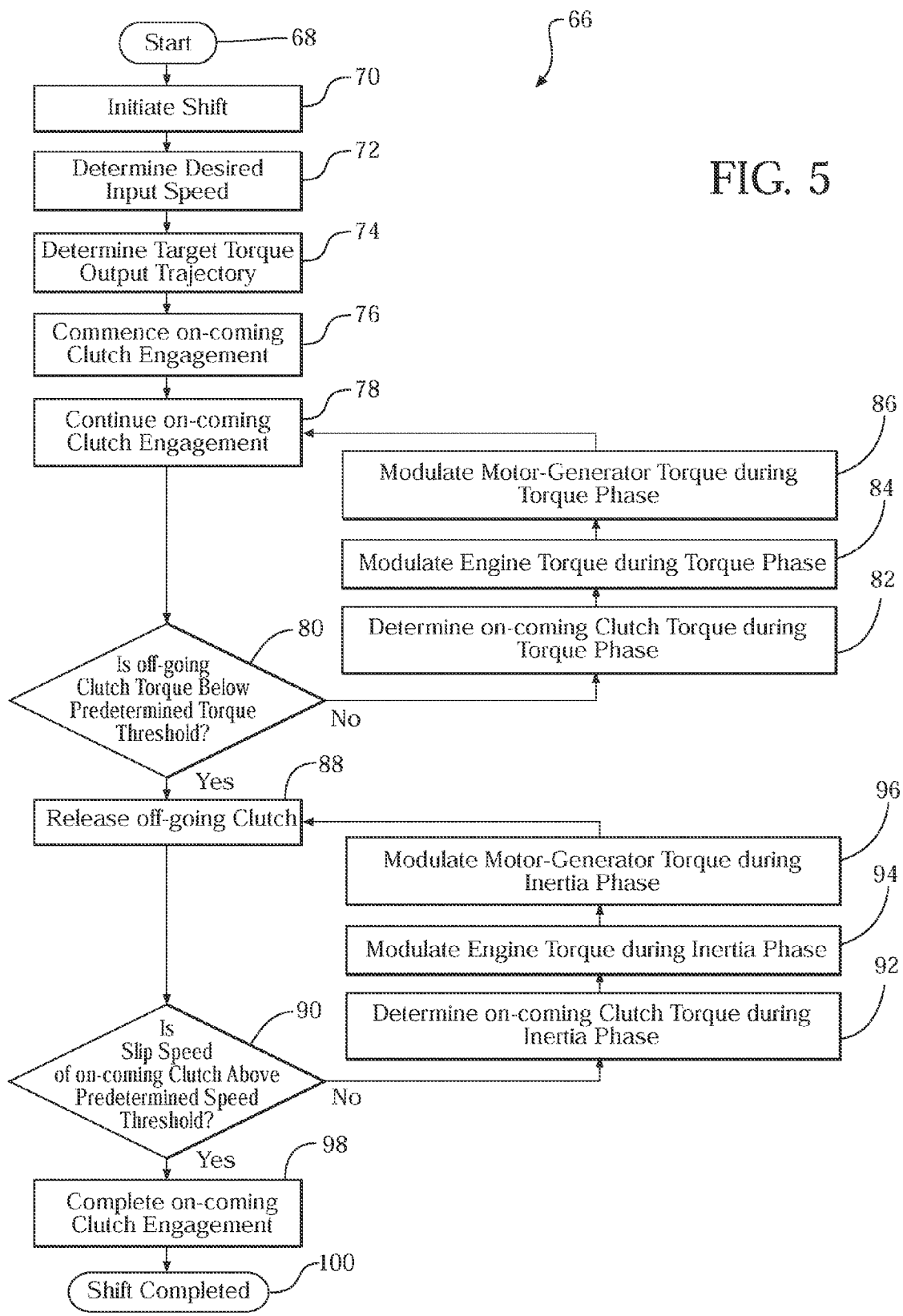

MOTOR-ASSIST SHIFT CONTROL IN A HYBRID VEHICLE TRANSMISSION

TECHNICAL FIELD

The invention relates to shift control in a vehicle transmission, and, more particularly, to motor-assist shift control in a transmission of a hybrid vehicle.

BACKGROUND OF THE INVENTION

In modern vehicles, automatically shiftable transmissions are utilized in vehicle drivelines to enhance vehicle operator comfort and convenience. Typically, up-shifts through forward ratios of such a transmission are accomplished in a power-on mode, i.e., while the engine is supplying input torque to the transmission. Such a transmission may be utilized as part of a conventional powertrain, i.e., employing a single engine, or in a hybrid powertrain, where two or more distinct power sources, such as an engine and an electric motor, are employed to propel the vehicle.

In order to maximize fuel efficiency in a hybrid vehicle, the engine may be shut off when the vehicle is in a coast down mode, i.e., when the vehicle is decelerating from elevated speeds due to road interface and vehicle driveline friction, as well as due to air resistance, or during braking. While the hybrid vehicle is in coast down mode, vehicle inertia may be employed to back-drive the electric motor in generator mode for recharging vehicle batteries, thereby improving efficiency further. Hybrid vehicle deceleration may also be provided via a regenerative braking system, where the engine may likewise be shut off, and the otherwise lost braking energy is similarly recaptured via the electrical motor. When a hybrid vehicle is in a deceleration mode, because its engine is typically shut off, the engine cannot provide torque input to the vehicle's automatic transmission. Consequently, while the hybrid transmission is executing shifts, such an input torque interruption may generate unwanted driveline disturbances.

SUMMARY OF THE INVENTION

A method for operating a motor vehicle hybrid powertrain having an engine, a motor-generator and a multi-speed automatically-shiftable transmission is provided. As used herein, "multi-speed automatically-shiftable" refers to a transmission that generally employs a geartrain arrangement, such as a planetary or a parallel axis gearset. Such a transmission typically utilizes discrete gear ratios to generate a speed-torque conversion, i.e., a gear or a speed reduction, to more efficiently power a vehicle. The method reduces or minimizes an output torque disturbance in the transmission during a gear shift.

According to the method, the engine and the motor-generator are each operatively connected to the transmission to provide a supply of torque for driving the vehicle. The method includes modulating the supply of torque from the motor-generator to the transmission during the gear shift, thereby reducing the output torque disturbance. In addition to modulating the supply of torque from the motor-generator to the transmission, the method may include modulating the supply of torque from the engine.

The method may additionally include initiating a gear shift from an off-going gear into an on-coming gear in the transmission via an off-going clutch and an on-coming clutch. The method may also include determining desired transmission input speed in the on-coming gear corresponding to transmission output speed, and determining a target trajectory of a magnitude of output torque during the shift. Furthermore, the method may include commencing engagement of the on-coming clutch and determining a magnitude of torque transmitted by the on-coming clutch.

The method may additionally include continuing engagement of the on-coming clutch to achieve the determined magnitude of output torque in the on-coming gear. Moreover, the method may include determining whether a magnitude of torque transmitted by the off-going clutch is below a predetermined torque threshold and releasing the off-going clutch if the off-going clutch torque is below the predetermined torque threshold. The method may also include determining whether a slip speed of the on-coming clutch is below a predetermined slip speed threshold value, and, if the slip speed of the on-coming clutch is below the predetermined slip speed threshold value, completing the engagement of the on-coming clutch. Thus, the engagement of the on-coming clutch is intended to achieve the desired transmission input speed and the determined magnitude of output torque in the on-coming gear.

According to the method, the initiated transmission gear shift may be a power-off down-shift, i.e., a down-shift performed with the engine not supplying power to the transmission. In the course of such a down-shift, modulating of the supply of torque from the engine may be accomplished by shutting the engine off, and modulating the supply of torque from the motor-generator may be accomplished by initially supplying a first measure of torque and then a second measure of torque from the motor-generator to the transmission. Additionally, during the downshift, braking energy of the motor vehicle may be regenerated or recaptured via the motor-generator, creating a so-called "regenerating" downshift.

According to the method, during the down-shift, the magnitude of output torque in the on-coming gear to be achieved by continuing the engagement of the on-coming clutch may be determined according to mathematical relationships $T_{out} = a1 * T_{off\text{-}going} + b1 * T1_{m\text{-}g}$ and $N_i\ \text{dot} = a2 * T_{off\text{-}going} + b2 * T1_{m\text{-}g}$, characterizing a torque transmission phase of the on-coming clutch during the shift. In the above torque transmission phase relationship, $T_{out}$ is the magnitude of output torque, $T_{off\text{-}going}$ is the torque in the off-going clutch, $T1_{m\text{-}g}$ is the first measure of torque supplied to the transmission by the motor-generator, and $N_i$ dot is the desired transmission input shaft acceleration. Terms a1, b1, a2 and b2 are constants that are defined by kinematic and inertial properties of the transmission in various gear states.

Additionally, during the down-shift, once the off-going clutch is unloaded and released, the magnitude of output torque in the on-coming gear to be achieved by completing the engagement of the on-coming clutch is determined according to mathematical relationships $T_{out} = c1 * T_{on\text{-}coming} + d1 * T2_{m\text{-}g}$ and $N_i\ \text{dot} = c2 * T_{on\text{-}coming} + d2 * T2_{m\text{-}g}$, characterizing an inertia phase of the on-coming clutch during the shift. In the above inertia phase relationship, $T_{out}$ is the magnitude of output torque, $T_{on\text{-}coming}$ is the torque in the on-coming clutch, $T2_{m\text{-}g}$ is the second measure of torque supplied to the transmission by the motor-generator, and $N_i$ dot is the desired transmission input shaft acceleration. Terms c1, d1, c2, d2 are constants that are defined by kinematic and inertial properties of the transmission in various gear states.

According to the method, the initiated transmission gear shift may also be a power-on up-shift. In the course of such an up-shift, modulating the supply of torque from the motor-generator may be accomplished by ceasing supplying torque or supplying negative torque to the transmission via the motor-generator. To modulate the supply of torque from the engine, the motor-generator may be driven via the engine.

During such an up-shift, inertia energy of the engine may be regenerated or recaptured via the motor-generator.

The above features and advantages, and other features and advantages of the present invention are readily apparent from the following detailed description of the best mode for carrying out the invention when taken in connection with the accompanying drawings.

BRIEF DESCRIPTION OF THE DRAWINGS

FIG. 4 is a graphical depiction of a time plot trajectory of output torque in an automatic transmission experienced during a motor-generator assisted and controlled up-shift gear change according to a second embodiment; and FIG. 5 schematically illustrates, in flow chart format, a method for assisting and controlling a gear shift with a motor-generator in an automatic transmission of a hybrid vehicle, as shown in FIGS. 2 and 4.

DESCRIPTION OF THE PREFERRED EMBODIMENT

Figure 1:
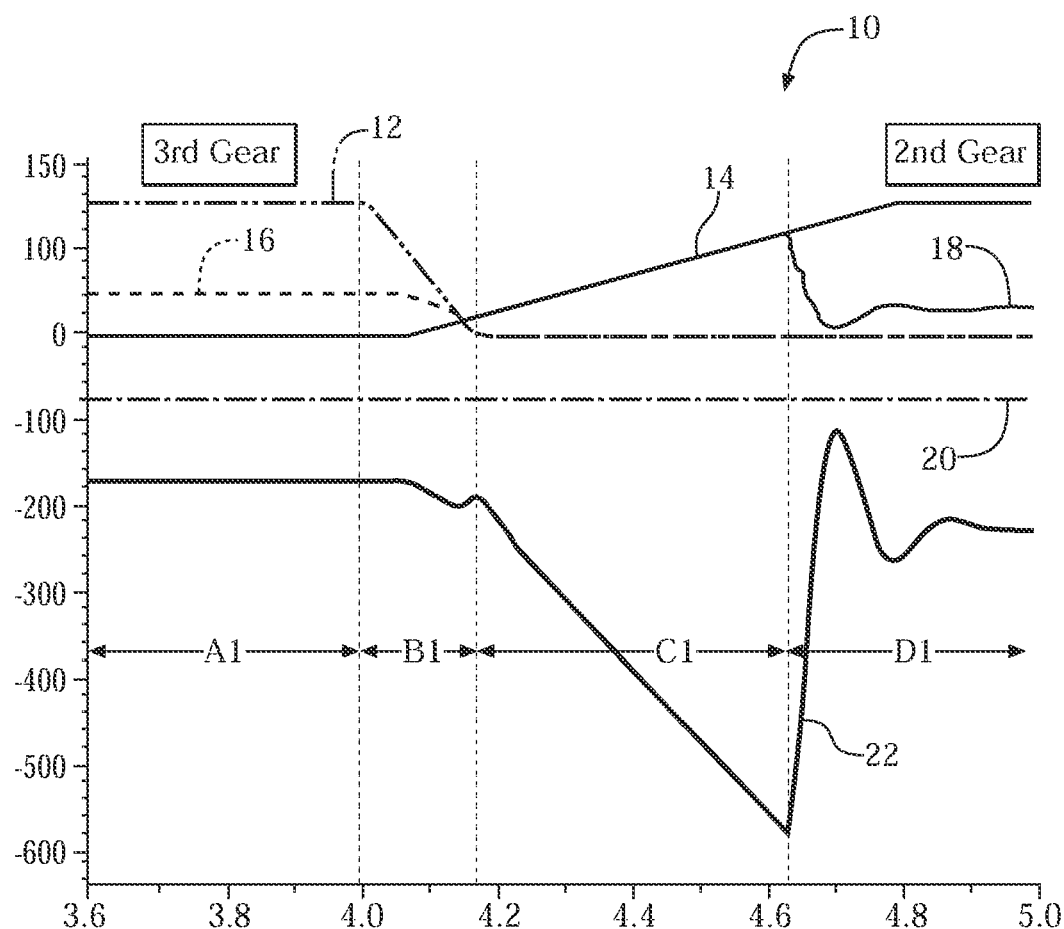
FIG. 1 is a graphical depiction of a time plot trajectory of output torque in an automatic transmission experienced during a typical power-off down-shift gear change with constant regenerative braking torque according to prior art.

A multi-speed automatically-shiftable transmission may be employed as part of a powertrain for a hybrid vehicle, of the type that includes an internal combustion engine, either a spark or a compression ignition type, and an electric motor-generator, as understood by those skilled in the art. Such a powertrain may be configured as either a P1 or a P2 hybrid, where the motor/generator is located upstream of the shifting elements, for example clutches or brakes, of the transmission. Typically, P1 is a term used for a hybrid where the motor is connected to the engine crankshaft, and P2 is term used for a hybrid where the motor is connected to the transmission input. In the case of either the P1 or the P2 hybrid, the vehicle may be propelled alternatively by the engine, by the electric motor, or by a combination of the two. Generally, an automatic transmission, as contemplated herein, utilizes a plurality of shifting elements to complete a gear shift, where, for example, one clutch is being disengaged as another clutch is being engaged. The clutch being disengaged is commonly referred to as an off-going clutch, whereas the clutch being engaged is commonly referred to as an on-coming clutch.

During vehicle deceleration, either during vehicle coast down or during braking, it is common to back-drive the motor-generator, i.e., operate the motor-generator in generator mode via vehicle inertia, to recapture or regenerate otherwise lost energy. Such recaptured energy may be used to charge a vehicle on-board energy storage device, such as a battery, thereby improving the powertrain's overall energy efficiency. Simultaneously, and for the same purpose, during regeneration a hybrid's internal combustion engine is typically shut off. At the same time, with the engine in the power-off mode, the hybrid's multi-speed automatically-shiftable transmission is required to down-shift through its speed ranges, i.e., gears, in order to provide appropriate engine rpm and response the moment the engine is restarted. While in the regeneration mode, however, the motor-generator creates additional powertrain drag. Such drag generally results in significant vehicle deceleration, imparts a transmission output torque disturbance and generates a substantial degradation in subjective down-shift feel. According to a first embodiment, in order to minimize such a transmission output torque disturbance, the motor-generator is controlled to provide a torque-assist, i.e., torque input, to the transmission during the power-off down-shift.

During vehicle acceleration, with the engine power on, it is common to operate the motor-generator in the motor mode to provide a power assist, or supplemental torque input for enhancing vehicle acceleration. During such acceleration, the hybrid's multi-speed automatically-shiftable transmission is required to up-shift through its speed ranges or gears in order to provide appropriate engine rpm and response. As the transmission up-shifts in this power-on mode, however, the engine input torque typically generates a transmission output torque disturbance that may reduce subjective smoothness of the up-shift, whether the motor-generator provides torque assist or not. According to a second embodiment, in order to minimize such a transmission output torque disturbance, the motor-generator is controlled to provide absorption of a portion of the engine torque during the power-on up-shift. In the description provided below, specific transmission gears have been chosen to illustrate, in an exemplary manner, gear shifts occurring during typical transmission operation.

Referring to the drawings in which like elements are identified with identical numerals throughout, FIG. 1 illustrates a typical power-off down-shift gear change 10 (shown as a down-shift from third gear to second gear) in an automatic transmission employed as part of a hybrid powertrain according to prior art. The illustration of the down-shift gear change 10 includes a trend line 12 representing a torque capacity of the off-going clutch (time plot trajectory of transmission output torque in third gear), and a trend line 14 representing a torque capacity of the on-coming clutch (time plot trajectory of transmission output torque in second gear). Trend line 12 shows the output torque in third gear remaining at approximately 150 N-m during a time frame A1, representing an approximate span of 3.6-4.0 seconds. Trend line 12 also shows the torque capacity of the off-going clutch gradually dropping to 0 N-m during a "torque phase" time frame B1 of the shift, representing an approximate span of 4.0-4.2 seconds. Thereafter, the trend line 12 shows the torque capacity of the off-going clutch remaining at 0 N-m, i.e. during an "inertia phase" time frame C1 representing an approximate span of 4.2-4.6 seconds, and during time frame D1 representing an approximate span of 4.6-5.0 seconds. Trend line 14 shows the torque capacity of the on-coming clutch remaining at approximately 0 N-m during time frame A1. Trend line 14 also shows the torque capacity of the on-coming clutch gradually increasing to 150 N-m during time frame B1, through time frame C1, and into time frame D1. As used herein, the term "torque phase" represents a gradual unloading of torque in the off-going clutch and commencement of engagement of the on-coming clutch. The term "inertia phase" is employed to represent a part of the gear shift where the slip speeds of the on-coming clutch and the off-going clutch change.

The illustration of the down-shift gear change 10 also includes a trend line 16 representing a time plot trajectory of actual off-going clutch torque and a trend line 18 representing a time plot trajectory of actual on-coming clutch torque. Trend line 16 shows the off-going clutch consistently transmitting approximately 50 N-m during time frame A1, and then shows the off-going clutch transmitted torque in the transitory torque phase gradually dropping to 0 N-m during time frame B1. Trend line 16 also shows the off-going clutch arriving at 0 N-m, and remaining at this level during time frames C1 and D1. Trend line 18 shows the on-coming clutch transmitting 0 N-m during time frame A1. Trend line 18 also shows the on-coming clutch transmitted torque gradually increasing during time frame B1 and into the transitory inertia phase time frame C1, gradually increasing to approximately 120 N-m. After approximately the 4.6 second mark during time frame D1, trend line 18 shows the transmitted on-coming clutch torque dropping off and eventually settling at a level of approximately 30 N-m.

Further included in the illustration of the down-shift gear change 10 is a trend line 20 representing output torque absorbed by the motor-generator, and a trend line 22 representing a transmission output torque disturbance. Trend line 20 shows the motor-generator in the regeneration mode, being driven by inertia of the vehicle, creating a steady level of drag (shown as a negative torque value) on the transmission having an approximate magnitude of −70 N-m during time frames A1-D1 of the down-shift. Trend line 22 shows the output torque disturbance remaining relatively flat at approximately −160 N-m during time frame A1. The output torque disturbance trend line 22 begins to fluctuate and generally increase (represented by a larger negative value) during time frame B1, and shows a rapid gain to approximately −580 N-m during majority of time frame C1. After a sharp inflection point occurring just prior to 4.7 second mark (during time frame D1), trend line 22 shows the transmission output torque rapidly decreasing and eventually settling at a level of approximately −220 N-m. Thus, with the engine shut off, with the off-going clutch and the on-coming clutch operating in their respective transitory phases, output torque disturbance is aggravated by drag from the motor-generator operating in the regeneration mode. As a result, the ensuing output torque disturbance rapid gain from −160 N-m to −580 N-m within approximately a 0.5 second time span imparts a substantial degradation in subjective down-shift feel.

Figure 2:
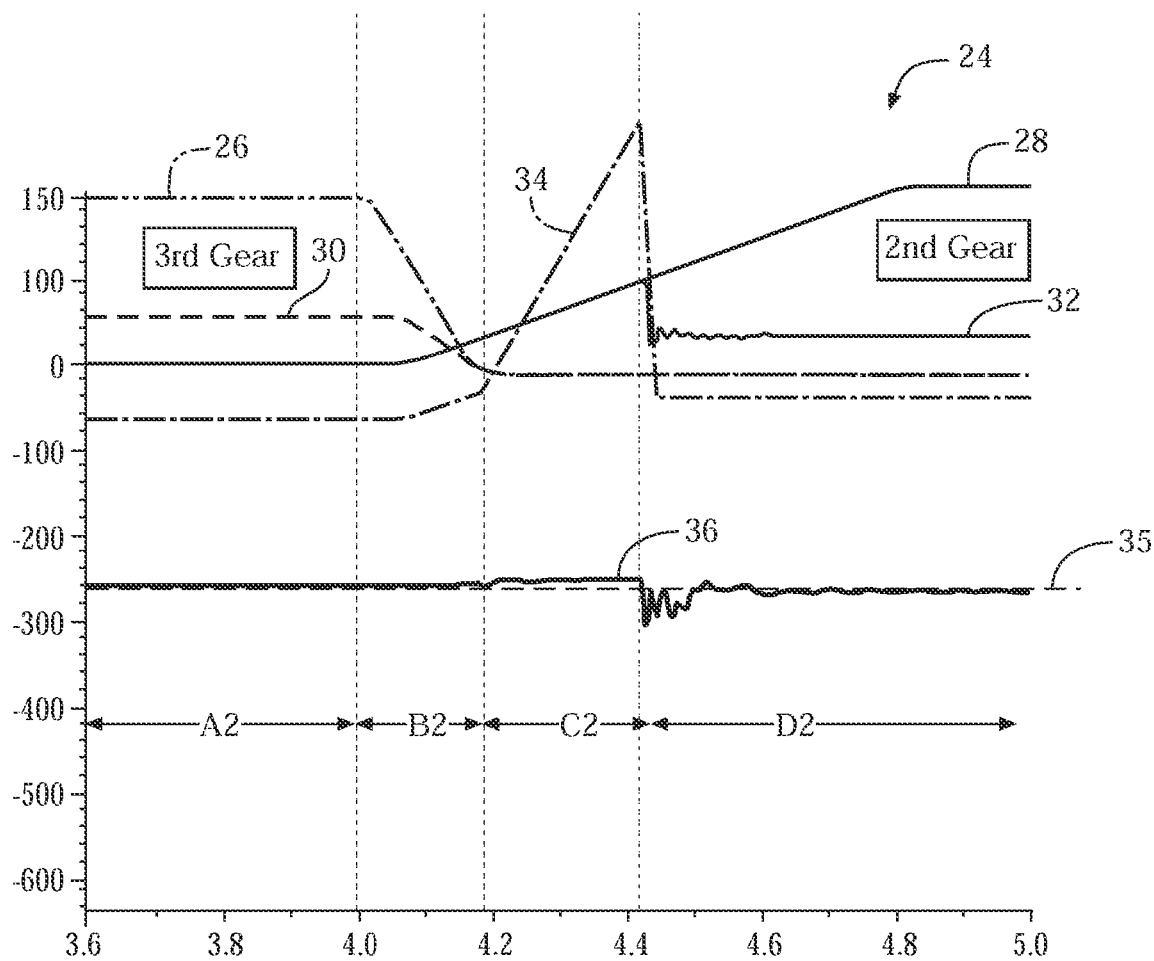
FIG. 2 is a graphical depiction of a time plot trajectory of output torque in an automatic transmission experienced during a motor-generator assisted and controlled power-off down-shift gear change with constant regenerative braking torque according to a first embodiment.

FIG. 2 illustrates a motor-generator torque-assisted power-off down-shift gear change 24 (shown as a third gear to second gear down-shift) in an automatic transmission employed as part of a hybrid powertrain according to the first embodiment. The illustration of the down-shift gear change 24 includes a trend line 26 representing a torque capacity of the off-going clutch, and a trend line 28 representing a torque capacity of the on-coming clutch. Trend line 26 and trend line 28 are identical to trend line 12 and trend line 14 of FIG. 1, respectively. Accordingly, trend line 26 torque capacity of the off-going clutch remains at approximately 150 N-m during time frame A2, and gradually drops to 0 N-m during a time frame B2, and thereafter trend line 26 output torque remains at 0 N-m. Correspondingly, trend line 28 torque capacity of the on-coming clutch remains at approximately 0 N-m during time frame A2, gradually increases to 150 N-m during time frame B2, through time frame C2, and into time frame D2. Time frames A2 and B2 are same as time frames A1 and B1 of FIG. 1, whereas time frame C2 represents an approximate span of 4.2-4.4 seconds, and D2 represents an approximate span of 4.4-5.0 seconds. FIG. 2, thereby, illustrates that in sum the transitory phases of the power-off down-shift with a motor-generator torque-assist takes less time than the transitory phases of a comparable unassisted power-off down-shift (as shown in FIG. 1).

The illustration of the down-shift gear change 24 also includes a trend line 30 representing a time plot trajectory of actual off-going clutch torque and a trend line 32 representing a time plot trajectory of actual on-coming clutch torque. Trend line 30 and trend line 32 are analogous to trend line 16 and trend line 18 of FIG. 1, respectively. Trend line 30 shows the off-going clutch consistently transmitting approximately 50 N-m during time frame A2, and then shows the off-going clutch transmitted torque in a transitory torque phase gradually dropping to 0 N-m during time frame B2. Trend line 30 also shows the off-going clutch arriving at 0 N-m, and remaining at this level during time frames C2 and D2. Trend line 32 shows the on-coming clutch transmitting 0 N-m during time frame A2. Trend line 32 also shows the on-coming clutch transmitted torque in a transitory inertia phase during time frame B2 and into time frame C2, gradually increasing to approximately 70 N-m. After approximately the 4.4 second mark during time frame C2, trend line 32 shows the transmitted on-coming clutch torque dropping off and eventually settling at a level of approximately 30 N-m.

Further included in the illustration of the down-shift gear change 24 is a trend line 34 representing output torque absorbed by the motor-generator during the regeneration mode, as well as a torque-assist provided by the motor-generator to the transmission. Also included in the illustration of the down-shift gear change 24 is a trend line 35 representing a target trajectory of transmission output torque during the gear change. Furthermore, the illustration of the gear change 24 includes a trend line 36 representing a transmission output torque disturbance as modified by the motor-generator torque-assist. Trend line 34 shows the motor-generator operation being modulated to vary the torque input to and output from the transmission. Trend line 34 shows the motor-generator in the regeneration mode, being driven by inertia of the vehicle, creating a steady level of drag on the transmission having an approximate magnitude of 70 N-m during time frame A2, and into time frame D2 of the down-shift. Trend line 34 shows the motor-generator shifting into the torque-assist mode within time frame B2, around the 4.1 second mark. The trend line 34 crosses over the 0 N-m torque threshold and begins to provide torque-assist to the transmission reaching a torque input of 180 N-m within time frame C2. By time frame D2, the trend line 34 torque-assist is removed, and the motor-generator is returned to regeneration mode providing a steady level of drag having an approximate magnitude of 70 N-m.

As shown in FIG. 2, the trend line 36 depicting the output torque disturbance remains relatively flat at approximately 160 N-m through time frames A2 and B2, and through most of the time frame C2. The output torque disturbance trend line 36 shows a perceptible torque fluctuation around the 4.5 second mark, having a peak to peak magnitude of approximately 30 N-m. The output torque disturbance fluctuations continue and slowly abate during time frame D2, however, these fluctuations compare quite favorably with those of trend line 22 in FIG. 1, where the output torque disturbance has a peak to peak magnitude of approximately 420 N-m. As can be seen from FIG. 2, the output torque trend line 36 essentially tracks the target trajectory of transmission output torque trend line 35 during the gear change. The output torque trend line 36 of the motor-assisted down-shift appears considerably smoother than the trend line 22 of the unassisted down-shift. Therefore, the ensuing output torque disturbance depicted by trend line 36 has been reduced as compared with the unassisted case in FIG. 1, and results in an improved subjective feel of the power-off down-shift in the actual vehicle.

The engine, unlike the motor-generator, is not an effective source of torque-assist to the hybrid transmission during the power-off down-shift. The ineffectiveness of engine in this regard is owing to at least two separate reasons: 1) engine braking is difficult to control because it is a function of massinertia and friction, and therefore engine torque output is not constant, i.e. engine torque itself fluctuates to a significant degree, and 2) during the down-shift, the engine is likely to be shut off or disconnected from the rest of the powertrain for regeneration.

Figure 3:
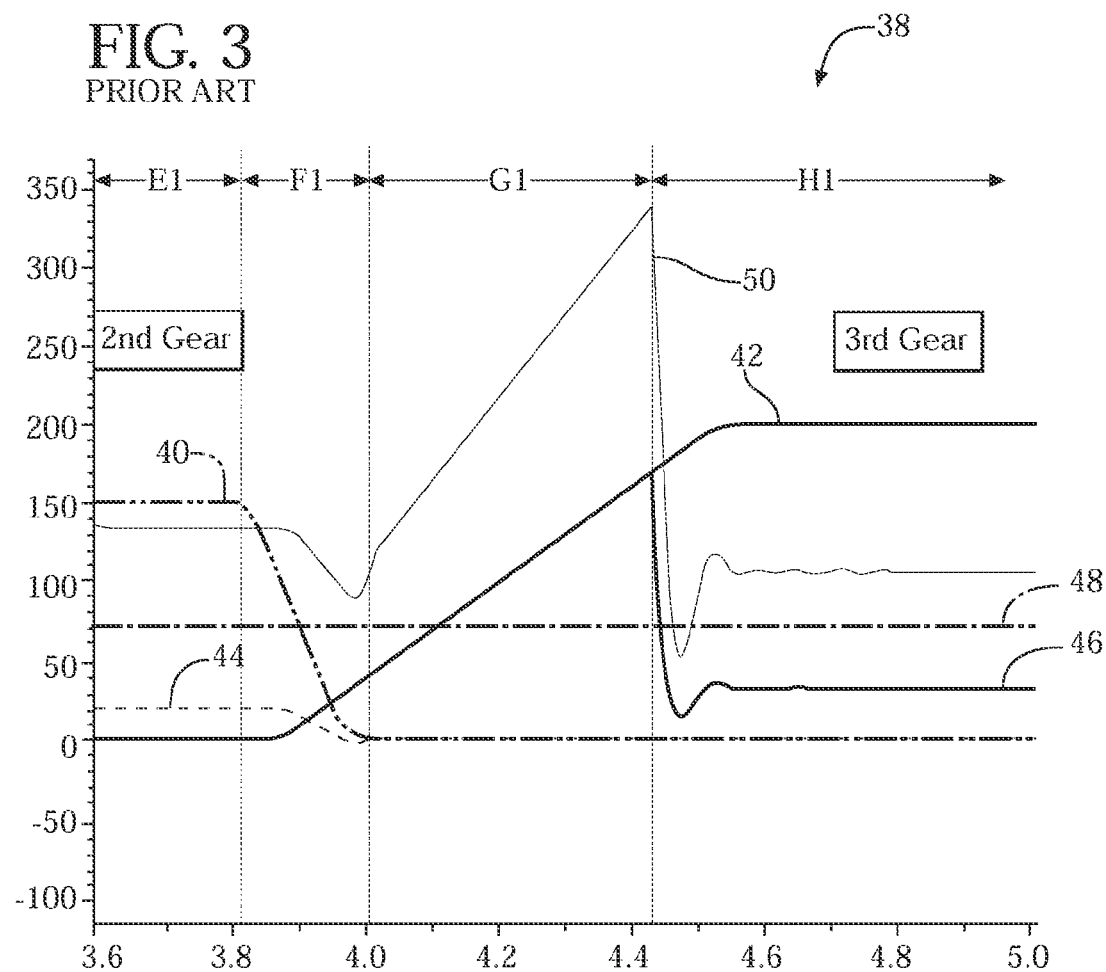
FIG. 3 is a graphical depiction of a time plot trajectory of output torque in an automatic transmission experienced during a typical up-shift gear change according to prior art.

FIG. 3 illustrates a typical power-on up-shift gear change 38 (shown as an up-shift from second gear to third gear) in an automatic transmission employed as part of a hybrid powertrain according to prior art. The illustration of the up-shift gear change 38 includes a trend line 40 representing a torque capacity of the off-going clutch, and a trend line 42 representing a torque capacity of the on-coming clutch. Trend line 40 shows the torque capacity of the off-going clutch initially maintaining approximately 150 N-m during a time frame E1, representing an approximate span of 3.6-3.8 seconds. Shortly after the 4.0 second mark during time frame E1, trend line 40 shows the torque capacity of the off-going clutch beginning to drop off. Trend line 40 shows the torque capacity of the off-going clutch continuing to drop and reaching 0 N-m during a time frame F1, which covers an approximate span of 3.8-4.0 seconds. Trend line 40 shows the torque capacity of the off-going clutch remaining at 0 N-m during a time frame G1, representing an approximate span of 4.0-4.4 seconds, and during a time frame H1, representing an approximate span of 4.4-5.0 seconds. Trend line 42 shows the torque capacity of the on-coming clutch remaining at approximately 0 N-m during time frame E1. Trend line 42 also shows the torque capacity of the on-coming clutch gradually increasing to 170 N-m during time frame F1, through time frame G1, and into time frame H1.

The illustration of the up-shift gear change 38 also includes a trend line 44, representing a time plot trajectory of actual off-going clutch torque and a trend line 46 representing a time plot trajectory of actual on-coming clutch torque. Trend line 44 shows the off-going clutch consistently transmitting approximately 20 N-m during time frame E1, and then shows the off-going clutch transmitted torque in a transitory torque phase gradually decreasing to 0 N-m during time frame F1. Trend line 44 also shows the off-going clutch transmitted torque remaining at 0 N-m throughout time frames G1 and H1. Trend line 46 shows the on-coming clutch transmitting 0 N-m during time frame E1. Trend line 46 also shows the on-coming clutch transmitted torque in a transitory inertia phase during time frame F1, through time frame G1, gradually increasing to approximately 170 N-m during time frame H1. After approximately the 4.6 second mark during time frame H1, trend line 46 shows the transmitted on-coming clutch torque dropping off sharply and eventually settling at a level of approximately 30 N-m.

Further included in the illustration of the up-shift gear change 38 is a trend line 48 representing input torque provided by the motor-generator, and a trend line 50 representing a transmission output torque disturbance. Trend line 48 shows the motor-generator in the supplemental torque input mode, assisting with driving the vehicle. As depicted by the trend line 48, motor-generator supplements engine torque by providing a torque assist having an approximate magnitude of 70 N-m (shown as a positive torque value) during time frames E1-H1 of the up-shift. Trend line 50 shows the output torque disturbance remaining relatively flat at approximately 130 N-m during time frame E1. The output torque of trend line 50 begins to fluctuate, experiences a shallow drop of 50 N-m (from 130 N-m to 80 N-m) during time frame F1, and then shows a rapid gain to approximately 340 N-m during the beginning stages of time frame H1. After a sharp inflection point occurring just prior to 4.7 second mark (during time frame H1), trend line 50 shows the transmission output torque rapidly decreasing, fluctuating, and eventually settling at a level of approximately 120 N-m. Thus, with the engine running and supplying torque to the transmission, with the off-going clutch and the on-coming clutch operating in their respective transitory phases, output torque disturbance is aggravated by the input from the motor-generator operating in the torque assist mode. As a result, the ensuing output torque disturbance rapid gain from 130 N-m to 340 N-m within approximately a 0.5 second time span imparts a substantial degradation in subjective up-shift feel.

FIG. 4 illustrates a motor-generator assisted power-on up-shift gear change 52 (shown as an up-shift from second gear to third gear) in an automatic transmission employed as part of a hybrid powertrain according to the second embodiment. The illustration of the down-shift gear change 52 includes a trend line 54 representing a torque capacity of the off-going clutch and a trend line 56 representing a torque capacity of the on-coming clutch. Trend line 54 and trend line 56 are identical to trend line 40 and trend line 42 of FIG. 3, respectively. Accordingly, trend line 54 torque capacity of the off-going clutch maintains approximately 150 N-m during a time frame E2, and gradually drops off to 0 N-m during time frame F2, and thereafter trend line 54 output torque remains at 0 N-m. Correspondingly, trend line 56 torque capacity of the on-coming clutch remains at approximately 0 N-m during time frame E2, gradually increases to 150 N-m during time frame F2, through time frame G2, and into time frame H2. Time frame E2 represents an approximate span of 3.6-3.9 seconds, time frame F2 represents an approximate span of 3.9-4.2 seconds, time frame G2 represents an approximate span of 4.2-4.5 seconds, and time frame H2 represents an approximate span of 4.5-5.0 seconds. A motor-generator torque-assist may be employed to shorten a typical power-on up-shift, where in sum the transitory phases of the shift take less time, as compared with a typical unassisted power-off down-shift.

The illustration of the up-shift gear change 52 also includes a trend line 58, representing a time plot trajectory of actual off-going clutch torque and a trend line 60 representing a time plot trajectory of actual on-coming clutch torque. Trend line 58 and trend line 60 are analogous to trend line 44 and trend line 46 of FIG. 3, respectively. Trend line 58 shows the off-going clutch consistently transmitting approximately 20 N-m during time frame E2, and then shows the off-going clutch transmitted torque in a transitory torque phase gradually decreasing to 0 N-m during time frame F2. Trend line 58 also shows the off-going clutch transmitted torque remaining at 0 N-m throughout time frames G2 and H2. Trend line 60 shows the on-coming clutch transmitting 0 N-m during time frame E2. Trend line 60 also shows the on-coming clutch transmitted torque in a transitory inertia phase during time frame F2, through time frame G2, gradually reaching approximately 140 N-m during time frame G2. After approximately the 4.5 second mark during time frame G2, trend line 60 shows the transmitted on-coming clutch torque dropping off sharply and eventually settling at a level of approximately 40 N-m.

Further included in the illustration of the up-shift gear change 52 is a trend line 62 representing torque input from the motor-generator to the transmission for driving the vehicle, as well as torque absorbed by the motor-generator. Also included in the illustration of the up-shift gear change 52 is a trend line 63 representing a target trajectory of transmission output torque during the gear change. Furthermore, the illustration of the up-shift gear change 52 also includes a trend line 64 representing a transmission output torque disturbance, as modified by the motor-generator assist, which in this case provides absorption of a portion of engine torque. Trend line 62 shows the motor-generator operation being modulated to vary the torque input to and output from the transmission. Trend line 62 shows the motor-generator in the drive assist mode, providing a steady level of torque input to the transmission having an approximate magnitude of 70 N-m during time frame E2, and gradually rising to 80 N-m during time frame F2 of the up-shift. Trend line 62 shows the motor-generator shifting into the torque-absorption mode due to being back-driven by the engine, around the 4.2 second mark during time frame G2. The trend line 62 crosses over the 0 N-m torque threshold where the motor-generator begins to absorb and regenerate engine torque, gradually absorbing 100 N-m near the 4.5 second mark. By time frame H2, the trend line 62 motor-generator assist is removed, and the motor-generator is returned to its drive assist mode where it provides a steady level of torque having an approximate magnitude of 80 N-m.

Trend line 64 depicting the output torque disturbance remains relatively flat at 135 N-m through frames E2 and F2. Around the 4.2 second mark of time frame G2, trend line 64 shows notable torque fluctuations. The experienced output torque fluctuations have a peak to peak magnitude of approximately 30 N-m, and continue during time frame G2 and into time frame H2. During time frame H2 torque fluctuations slowly abate and the torque output returns to a steady 135 N-m. As shown in FIG. 4, the output torque trend line 64 essentially tracks the target trajectory of transmission output torque trend line 63 during the gear change. By comparing FIGS. 3 and 4, it can be seen that output torque fluctuations of trend line 64 compare favorably with torque fluctuations during the unassisted up-shift of trend line 50, where the torque disturbance has a peak to peak magnitude of approximately 290 N-m. In other words, the output torque trend line 64 of the motor-assisted up-shift appears considerably smoother than the trend line 50 of the unassisted up-shift. Such smoother appearance of the trend line 64 represents an improved feel of the power-on up-shift in the actual vehicle.

In addition to smoothing out the up-shift gear change as seen in FIG. 4, the back-driving of the motor-generator additionally provides torque regeneration during the transitory phases of the off-going and the on-coming clutches. During the transitory phases of the off-going and the on-coming clutches, besides generating the transmission output torque disturbance, input power from the engine is typically dissipated as heat in the slipping clutches. Thus, the provided regeneration recaptures energy, otherwise wasted during the up-shift gear change, in the form of an electrical charge channeled to an on-board energy storage device, such as a battery.

FIG. 5 depicts a method 66 for operating a motor vehicle hybrid powertrain having an engine, a motor-generator and a multi-speed automatically-shiftable transmission reflecting the first embodiment depicted in FIG. 2 and the second embodiment depicted in FIG. 4. Method 66 commences in frame 68, and then proceeds to frame 70 where the motor-generator assisted gear shift or change is initiated in the automatic transmission employed as part of a hybrid powertrain. The contemplated gear change may be either the power-off down-shift according to the first embodiment, as described with respect to FIG. 2, or a power-on up-shift according to the second embodiment, as described with respect to FIG. 4. A controller, such as an electronic control unit (ECU), is typically employed to initiate the motor-generator assisted gear change at a time when an unassisted gear change would otherwise typically be appropriate, as understood by those skilled in the art.

Following frame 70, method 66 advances to frame 72, where the desired input speed of the transmission in the on-coming gear corresponding to the transmission output speed is determined based on the on-coming gear ratio, as known by those skilled in the art. Following frame 72, in frame 74 the target trajectory of magnitude of output torque of the transmission during the shift during the time frames A-D, as described above with respect to FIG. 2, and during time frames E-H, as described above with respect to FIG. 4, is determined. The target trajectory of the magnitude of output torque may be determined by calculating transmission output torque at discrete time periods during the gear shift. Such time periods should be chosen to provide sufficient data resolution and appropriate control of the motor-generator and the engine by the ECU.

Subsequent to determining the target trajectory of the magnitude of output torque in frame 74, method 66 proceeds to frame 76, where engagement of the on-coming clutch is commenced. Following frame 76, the method advances to frame 78, where engagement of the on-coming clutch is continued. Following frame 78, method 66 proceeds to frame 80, where a determination is made whether the torque of the off-going clutch is below a predetermined torque threshold. The off-going clutch torque threshold is typically predetermined during design and development of the hybrid powertrain, and identifies a level of torque below which the clutch is incapable of transmitting sufficient torque to propel the vehicle. If in frame 80 it is determined that the torque of the off-going clutch is at or above the predetermined torque threshold, the method loops back to frame 78 by proceeding through frames 82-86.

In frame 82, torque in the off-going clutch during its transitory operation, such as depicted by trend line 30 in time frames B2 and C2 of FIG. 2, is determined. The torque of the off-going clutch during its transitory operation is determined according to mathematical relationships $T_{out} = a1 * T_{off\text{-}going} + b1 * T1_{m\text{-}g}$ and $N_i \text{ dot} = a2 * T_{off\text{-}going} + b2 * T1_{m\text{-}g}$ characterizing the torque phase of the on-coming clutch during the shift. In the relationships for the torque transmission phase $T_{out}$ is the magnitude of output torque, $T_{off\text{-}going}$ is the torque in the off-going clutch, $T1_{m\text{-}g}$ is the first measure of torque supplied to the transmission by the motor-generator, and $N_i$ dot is the desired transmission input shaft acceleration. Terms a1, b1, a2 and b2 are analytically determined constants that are defined by kinematic and inertial properties of the transmission in various gear states, as understood by those skilled in the art.

Following frame 82, method 66 proceeds to frame 84, where torque of the engine is adjusted or modulated, and from there the method advances to frame 86, where torque of the motor-generator is adjusted as well. Accordingly, the aforementioned ECU is employed to adjust the torque of both the engine and of the motor-generator. If, however, it is determined that the torque of the off-going clutch is below the predetermined torque threshold, the method advances to frame 88, where the off-going clutch will be gradually released so that it may cease to transmit torque.

Following frame 88, method 66 proceeds to frame 90, where it is determined whether slip speed of the on-coming clutch is above a predetermined speed threshold. The on-coming clutch slip speed threshold identifies a moment in time during the inertia phase, shown as time frame C2 in FIG. 2 and time frame G2 in FIG. 4, past which the on-coming clutch has largely synchronized, and its slip speed is nearly zero. Consequently, if the on-coming clutch slip speed is above the predetermined speed threshold, the clutch may be engaged fully without a significant disturbance to the powertrain. Similarly to the off-going clutch torque threshold, typically the on-coming clutch slip speed threshold is predetermined during design and development of the hybrid powertrain. If in frame 90 it is determined that the slip speed of the on-coming clutch is not above the predetermined speed threshold, the method loops back to frame 88 by proceeding through frames 92-96.

In frame 92, torque of the on-coming clutch during its transitory operation, such as depicted by trend line 60 in time frames F2 and G2 of FIG. 4, is determined. The torque of the on-coming clutch during its transitory operation is determined according to mathematical relationships $T_{out}=c1*T_{on-coming}+d1*T2_{m-g}$ and $N_i$ $dot=c2*T_{on-coming}+d2*T2_{m-g}$ characterizing the inertia phase of the on-coming clutch during the shift. In the relationship for inertia phase $T_{out}$ is the magnitude of output torque, $T_{on-coming}$ is the torque in the on-coming clutch, $T2_{m-g}$ is the second measure of torque supplied to the transmission by the motor-generator, and $N_i$ dot is the desired transmission input shaft acceleration. Terms c1, d1, c2, d2 are analytically determined constants that are defined by kinematic and inertial properties of the transmission in various gear states, as understood by those skilled in the art.

Following frame 92, method 66 proceeds to frame 94, where torque of the engine is adjusted or modulated, and from there the method advances to frame 96, where torque of the motor-generator is adjusted as well. If, however, in frame 90 it is determined that the slip speed of the on-coming clutch is above the predetermined speed threshold, the method proceeds to frame 98. In frame 98, method 66 completes the engagement of the on-coming clutch, and then proceeds to frame 100, where the shift is completed, and the transmission fully achieves the next, heretofore on-coming gear.

While the best modes for carrying out the invention have been described in detail, those familiar with the art to which this invention relates will recognize various alternative designs and embodiments for practicing the invention within the scope of the appended claims.

The invention claimed is:

1. A method for operating a motor vehicle hybrid powertrain having an engine, a motor-generator and a multi-speed automatically-shiftable transmission, and for reducing an output torque disturbance in the transmission during a gear shift, the engine and the motor-generator each operatively connected to the transmission to provide a supply of torque for driving a vehicle, the method comprising:

modulating the supply of torque from the motor-generator to the transmission during the gear shift, sufficiently such that the output torque disturbance during the gear shift is minimized;

initiating the gear shift from an off-going gear into an on-coming gear via an off-going clutch and an on-coming clutch;

determining a desired transmission input speed corresponding to transmission output speed, and a magnitude of output torque in the on-coming gear;

commencing engagement of the on-coming clutch;

determining a magnitude of torque transmitted by the on-coming clutch;

continuing the engagement of the on-coming clutch to achieve the determined magnitude of output torque in the on-coming gear;

determining whether a magnitude of torque transmitted by the off-going clutch is below a predetermined torque threshold;

releasing the off-going clutch if the off-going clutch torque is below the predetermined torque threshold;

determining whether a slip speed of the on-coming clutch is below a predetermined slip speed threshold value; and completing the engagement of the on-coming clutch to achieve the desired transmission input speed and the determined magnitude of output torque in the on-coming gear if the slip speed of the on-coming clutch is below the predetermined slip speed threshold value.

2. The method of claim 1, further comprising modulating the supply of torque from the engine to the transmission.

3. The method of claim 1, wherein the transmission gear shift is a power-off down-shift.

4. The method of claim 2, wherein the modulating the supply of torque from the engine is accomplished by shutting the engine off, and modulating the supply of torque from the motor-generator is accomplished by initially supplying a first measure of torque and then a second measure of torque from the motor-generator to the transmission.

5. The method of claim 3, further comprising regenerating braking energy of the motor vehicle via the motor-generator during the down-shift.

6. The method of claim 1, wherein the magnitude of output torque in the on-coming gear to be achieved by continuing the releasing of the off-going clutch is determined according to mathematical relationships $T_{out}=a1*T_{off-going}+b1*T1_{m-g}$ and $N_i$ $dot=a2*T_{off-going}+b2*T1_{m-g}$ characterizing a torque transmission phase of the off-going clutch during the shift, wherein $T_{out}$ is the magnitude of output torque, $T_{offgoing}$ is the torque in the on-coming clutch, $T1_{m-g}$ is the first measure of torque supplied to the transmission by the motor-generator, $N_i$ dot is the desired transmission input shaft acceleration, and a1, b1, a2 and b2 are constants that are defined by kinematic and inertial properties of the transmission in various gear states.

7. The method of claim 1, wherein the magnitude of output torque in the on-coming gear to be achieved by completing the engagement of the on-coming clutch is determined according to mathematical relationships $T_{out}=c1*T_{on-coming}+d1*T2_{m-g}$ and $N_i$ $dot=c2*T_{on-coming}+d2*T2_{m-g}$, characterizing an inertia phase of the on-coming clutch during the shift, wherein $T_{out}$ is the magnitude of output torque, $T_{on-coming}$ is the torque in the on-coming clutch, $T2_{m-g}$ is the second measure of torque supplied to the transmission by the motor-generator, $N_1$ dot is the desired transmission input shaft acceleration, and c1, d1, c2, d2 are constants that are defined by kinematic and inertial properties of the transmission in various gear states.

8. The method of claim 1, wherein the transmission gear shift is a power-on up-shift.

9. The method of claim 8, wherein the modulating the supply of torque from the motor-generator is accomplished by ceasing supplying torque or supplying negative torque to the transmission via the motor-generator, and modulating the supply of torque from the engine is accomplished by driving the motor-generator via the engine.

10. The method of claim 1, further comprising regenerating inertia energy of the engine via the motor-generator.

11. The method of claim 1, wherein the modulating the supply of torque from the motor-generator reduces the duration of the gear shift.

12. A method for controlling a power-off down-shift in a multi-speed automatically-shiftable transmission employed in a hybrid motor vehicle, and reducing an output torque disturbance in the transmission during the down-shift, the vehicle having an engine capable of being turned on and shut off and a motor-generator, the engine and the motor-generator each operatively connected to supply torque to the transmission for driving the vehicle, the method comprising:

initiating the transmission power-off down-shift from an off-going gear to an on-coming gear via an off-going clutch and an on-coming clutch;

regenerating braking energy of the motor vehicle via the motor-generator;

determining a desired transmission input speed in the on-coming gear corresponding to transmission output speed;

determining a target trajectory of a magnitude of output torque during the down-shift;

commencing engagement of the on-coming clutch;

determining a magnitude of torque transmitted by the on-coming clutch;

applying a first measure of torque to the transmission by the motor-generator;

continuing the engagement of the on-coming clutch to achieve the determined magnitude of output torque in the on-coming gear;

determining whether a magnitude of torque transmitted by the off-going clutch is below a predetermined torque threshold;

releasing the off-going clutch if the off-going clutch torque is below the predetermined torque threshold;

applying a second measure of torque to the transmission by the motor-generator;

determining whether a slip speed of the on-coming clutch is below a predetermined slip speed threshold value; and completing the engagement of the on-coming clutch to achieve the desired transmission input speed and the determined magnitude of output torque in the on-coming gear if the slip speed of the on-coming clutch is below the predetermined slip speed threshold value, sufficiently such that the output torque disturbance during the power-off down-shift is minimized.

13. The method of claim 12, further comprising turning the engine off during the down-shift.

14. The method of claim 12, wherein the magnitude of output torque in the on-coming gear to be achieved by continuing the releasing of the off-going clutch is determined according to mathematical relationships $T_{out}=a1*T_{off\text{-}going}+b1*T1_{m\text{-}g}$ and $N_i dot=a2*T_{off\text{-}going}+b2*T1_{m\text{-}g}$ characterizing a torque transmission phase of the off-going clutch during the shift, wherein $T_{out}$ is the magnitude of output torque, $T_{off\text{-}going}$ is the torque in the on-coming clutch, $T1_{m\text{-}g}$ is the first measure of torque supplied to the transmission by the motor-generator, $N_i$ dot is the desired transmission input shaft acceleration, and a1, b1, a2 and b2 are constants that are defined by kinematic and inertial properties of the transmission in various gear states.

15. The method of claim 12, wherein the magnitude of output torque in the on-coming gear to be achieved by completing the engagement of the on-coming clutch is determined according to mathematical relationships $T_{out}=c1*T_{on\text{-}coming}+d1*T2_{m\text{-}g}$ and $N_i dot=c2*T_{on\text{-}coming}+d2*T2_{m\text{-}g}$, characterizing an inertia phase of the on-coming clutch during the shift, wherein $T_{out}$ is the magnitude of output torque, $T_{on\text{-}coming}$ is the torque in the on-coming clutch, $T2_{m\text{-}g}$ is the second measure of torque supplied to the transmission by the motor-generator, $N_i$ dot is the desired transmission input shaft acceleration, and c1, d1, c2, d2 are constants that are defined by kinematic and inertial properties of the transmission in various gear states.

16. A method for controlling a power-on up-shift in a multi-speed automatically-shiftable transmission employed in a hybrid motor vehicle, and for reducing an output torque disturbance in the transmission during the up-shift, the vehicle having an engine and a motor-generator, the engine and the motor-generator each operatively connected to supply torque to the transmission for driving the vehicle, the method comprising:

initiating the transmission power-on up-shift from an off-going gear to an on-coming gear via an off-going clutch and an on-coming clutch;

determining a desired transmission input speed in the on-coming gear corresponding to transmission output speed;

determining a target trajectory of a magnitude of output torque during the up-shift;

commencing engagement of the on-coming clutch;

determining a magnitude of torque transmitted by the on-coming clutch;

modulating the supply of torque from the motor-generator to the transmission;

modulating the supply of torque from the engine to the transmission;

continuing the engagement of the on-coming clutch to achieve the determined magnitude of output torque in the on-coming gear;

determining whether a magnitude of torque transmitted by the off-going clutch is below a predetermined torque threshold;

releasing the off-going clutch if the off-going clutch torque is below the predetermined torque threshold;

determining whether a slip speed of the on-coming clutch is below a predetermined slip speed threshold value; and completing the engagement of the on-coming clutch to achieve the desired transmission input speed and the determined magnitude of output torque in the on-coming gear if the slip speed of the on-coming clutch is below the predetermined slip speed threshold value, sufficiently such that the output torque disturbance during the power-on up-shift is minimized.

17. The method of claim 16, wherein the modulating the supply of torque from the motor-generator is accomplished by ceasing supplying torque or supplying negative torque to the transmission via the motor-generator, and modulating the supply of torque from the engine is accomplished by driving the motor-generator via the engine.

18. The method of claim 17, further comprising regenerating inertia energy of the engine via the motor-generator.

* * * * *